W. H. KEMPTON.
ARC SHIELD.
APPLICATION FILED JULY 25, 1918.

1,431,961.

Patented Oct. 17, 1922.

WITNESSES
W. S. Greece
O. E. Bee

INVENTOR
Willard H. Kempton
BY
Wesley G. Carr
ATTORNEY

Patented Oct. 17, 1922.

1,431,961

UNITED STATES PATENT OFFICE.

WILLARD H. KEMPTON, OF WILKINSBURG, PENNSYLVANIA, ASSIGNOR TO WESTINGHOUSE ELECTRIC & MANUFACTURING COMPANY, A CORPORATION OF PENNSYLVANIA.

ARC SHIELD.

Application filed July 25, 1918. Serial No. 246,767.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Arc Shields, of which the following is a specification.

My invention relates to arc shields, and it has for its primary object the provision of a highly refractory arc-resistive material which may be employed in the construction of arc shields.

One object of my invention is to provide a composite arc shield consisting of two materials which shall have substantially the same coefficient of expansion.

Another object of my invention is to provide a composite arc shield composed of two materials which will yield readily to the same treatment in the process of manufacture.

A still further object of my invention is to provide an arc shield comprising two compositions one of which is specially adapted to resist the action of arcs and to localize such composition at a predetermined portion of the arc shield which will be exposed to arcs.

Figure 1:
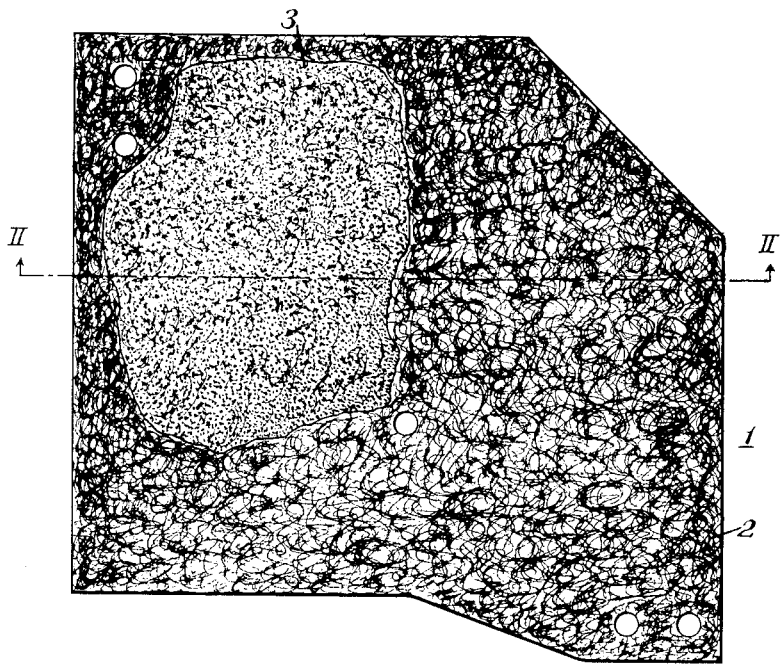
Figure 2:

With these and other objects in view, a better understanding of my invention may be had by reference to the drawings in which Fig. 1 is a plan view of an arc shield embodying my invention, and Fig. 2 is a section taken on the line II—II of Fig. 1.

In practicing my invention, I employ a composition comprising three ingredients which, when thoroughly mixed and molded and then treated, are so united and of such nature as to offer great resistance to electric arcs. Another course which may be followed in practicing my invention is to employ the aforesaid ingredients which form an efficient arc shield and mold these ingredients together with another composition so that the composition which is highly resistant to arcs shall be concentrated at a portion of the shield exposed to the arcs.

In Fig. 1 is shown one form of a shield 1 which may be composed of a moldable composition 2 comprising approximately 50% asbestos and 50% Portland cement, and a moldable material 3, which may be concentrated at one portion of the shield and may consist of substantially 50% carborundum, 10% asbestos fibre, and 40% Portland cement. The material 2 is thoroughly mixed with sufficient water and placed in a mold, a space being reserved to receive the material 3, which is similarly mixed. The two compositions may then be subjected to sufficient pressure to insure a perfect shield, after which the formed shield is removed from the mold and subjected to heating, curing and drying processes to remove all moisture from its composition. The heating, curing and drying processes may involve the use of a steam bath in which the molded shield is placed for three days after which it is removed and exposed to dry air for twenty-four hours and then subjected to vacuum drying for three hours at a temperature of about 60° C. The body thus built up may then be covered with a suitable waterproof coating, if desired, although the waterproof coating is not absolutely necessary to produce efficiency on the part of the shield. It is, however, customary to coat the shield in this way to prevent any absorption of moisture in the event of the shield being out of use for a long period. The shield may be formed entirely of the composition designated by the numeral 3 if so desired. This, however, is a more expensive form of shield and is unnecessary for the reason that the point which the arc will strike may be predetermined and, therefore, the shield requires the highly resistive material only at this point. The material 2 employed in the construction of the shield, as shown, being cheaper and yielding readily to the same treatment as the material 3 is, therefore, advantageous.

Although I have shown one form of an arc shield that may be constructed in accordance with my invention, it is obvious that the ingredients thereof may be slightly varied without departing from the spirit of my invention and I desire, therefore, that no limitations shall be imposed except such as are indicated in the appended claims.

I claim as my invention:

1. An arc shield comprising carborundum, Portland cement and asbestos.

2. An arc shield comprising substantially 50% carborundum, 40% Portland cement and 10% asbestos fibre.

3. An arc shield comprising a body portion composed of current and heat-resisting material and an insert of highly refractory arc-resistive material.

4. A molded arc shield comprising a body portion composed of current and heat-resisting material and an insert of highly refractory arc-resistive material.

5. An arc shield comprising a body portion formed of current and heat-resisting material and a localized portion composed of carborundum, Portland cement and asbestos fibre.

6. An arc shield comprising a body portion formed of current and heat-resisting material and a localized portion composed of substantially 50% carborundum, 40% Portland cement and 10% asbestos fibre.

7. An arc shield comprising a unitary molded body formed of Portland cement and asbestos and a localized portion composed of substantially 50% carborundum, 40% Portland cement and 10% asbestos fibre.

8. An arc shield comprising a molded body portion formed of substantially equal quantities of Portland cement and asbestos and an insert composed of approximately 50% carborundum, 40% Portland cement and 10% asbestos fibre.

9. A method of constructing arc shields which comprises molding a body composed in part of heat and current-resisting material and a localized portion of arc-resisting material and curing the molded body.

10. A method of constructing arc shields which comprises mixing Portland cement and asbestos, adding sufficient water thereto, placing the resulting composition in a mold, reserving a space therein, mixing carborundum, Portland cement and asbestos with water, filling the reserved space with the mixed composition of carborundum, Portland cement and asbestos, subjecting the two compositions to sufficient pressure to form a solid piece, removing the molded piece from the mold and subjecting it to curing, heating and drying processes.

11. A method of constructing arc shields which comprises mixing substantially equal quantities of Portland cement and asbestos, adding sufficient water thereto, placing the resulting composition in a mold, reserving a space therein, mixing approximately 50% carborundum, 40% Portland cement and 10% asbestos with water, filling the reserved space with a mixed composition of the above-mentioned proportions of carborundum, Portland cement and asbestos, and subjecting the two compositions to sufficient pressure to form a solid piece, removing the molded piece from the mold and subjecting it to curing, heating and drying processes.

In testimony whereof, I have hereunto subscribed my name this 22nd day of July 1918.

WILLARD H. KEMPTON.